United States Patent

[11] 3,580,446

[72] Inventors Yoshiyo Wada;
Katsuya Yasutake, Yokohama; Yoshikazu Terao, Tokyo, Japan
[21] Appl. No. 850,130
[22] Filed Aug. 14, 1969
[45] Patented May 25, 1971
[73] Assignee Victor Company of Japan, Limited
Yokohama, Japan
[32] Priority Aug. 16, 1968
[33] Japan
[31] 43/58,027

[54] MAGNETIC TAPE MOVEMENT-INITIATION SYSTEM
10 Claims, 7 Drawing Figs.

[52] U.S. Cl. 226/108, 226/195
[51] Int. Cl. G11b 15/43
[50] Field of Search 226/195, 108, 188, 36

[56] References Cited
UNITED STATES PATENTS

| | | | |
|---|---|---|---|
| 3,112,052 | 11/1963 | Johnson | 226/108UX |
| 3,323,702 | 6/1967 | Kjos | 226/108X |
| 3,419,202 | 12/1968 | Maxey | 226/195X |
| 3,447,729 | 6/1969 | Cass | 226/108X |

*Primary Examiner*—Allen N. Knowles
*Attorney*—Louis Bernat

ABSTRACT: A magnetic tape movement-initiation system which causes two magnetic tape drive means to operate such that one means is actuated with a time lag with respect to the other means. Said two magnetic tape drive means are mounted in the path of travel of a magnetic tape paid out from a supply reel and wound on a takeup reel such that one means is disposed on the supply reel side and the other means is disposed on the takeup reel side with respect to magnetic heads which are brought into contact with the magnetic tape.

INVENTORS
YOSHIYO WADA
KATSUYA YASUTAKE
YOSHIKAZU TERAO

BY [signature]
ATTORNEY

INVENTORS
YOSHIYO WADA
KATSUYA YASUTAKE
YOSHIKAZU TERAO

BY

ATTORNEY

INVENTORS
YOSHIYO WADA
KATSUYA YASUTAKE
YOSHIKAZU TERAO
BY [signature]
ATTORNEY

MAGNETIC TAPE MOVEMENT-INITIATION SYSTEM

The present invention relates to magnetic tape movement-initiation systems. More particularly, the invention is concerned with a system for initiating the movement of a magnetic tape for apparatus which comprise two magnetic tape drive means for moving the magnetic tape disposed in the path of travel of the magnetic tape and on opposite sides of a magnetic recording and reproducing section which is adapted to come into contact with the magnetic tape for effecting recording and reproducing of signals.

In magnetic recording and reproducing apparatus of the so-called double-capstan type which comprise two tape drive sections each consisting of a capstan and a pinch roller and disposed in the path of travel of a magnetic tape and on opposite sides of a magnetic head section or on a supply reel side and a takeup reel side, it has hitherto been customary to simultaneously start the operation of said two tape drive sections in initiating the movement of the magnetic tape. When this is the case, a long interval of time or 2 to 5 seconds generally elapses before the tension of a portion of the magnetic tape disposed between the two capstans becomes constant. During this interval of time, skew distortion occurs in the reproduced pictures. When the magnetic tape remains stationary, the tape is generally loosened. If the two pinch rollers are simultaneously brought into contact with the respective capstans to initiate the movement of the magnetic tape in the loosened condition, it takes a long interval of time for the tension of the magnetic tape to become constant. When the tape is greatly loosened, the magnetic tape may be brought out of contact with the magnetic recording and reproducing section, making it impossible to record or reproduce signals. In worst cases, the magnetic tape may be deflected from its normal path of travel or it may be displaced to the lower end of a guide pole, for example, with a result that the tape is damaged.

The present invention obviates all the aforementioned disadvantages involved in simultaneous operation of the two magnetic tape drive sections in conventional magnetic recording and reproducing apparatus of the double-capstan type.

Accordingly, a principal object of this invention is to provide a magnetic tape movement-initiation system which permits to initiate the movement of a magnetic tape in a stable manner.

Another object of the invention is to provide a system for initiating the movement of a magnetic tape and bringing the tape to a stable operation condition in a very short interval of time by causing tape drive sections to operate with a time lag such that one drive section is caused to operate earlier than the other drive section, said tape drive sections being disposed in the path of travel of the magnetic tape and on opposite sides of a magnetic recording and reproducing section which is adapted to come into engagement with the magnetic tape.

Further object of the invention is to provide a magnetic tape movement-initiation system which permits to keep constant the tension of a portion of the magnetic tape disposed between the two tape drive sections immediately after the movement of the magnetic tape is initiated.

Still further object of the invention is to provide a system which permits to initiate the movement of the magnetic tape, particularly in magnetic recording and reproducing apparatus, such that almost no skew distortion occurs immediately after the movement of the magnetic tape is initiated.

Additional objects as well as features and advantages of the invention will become evident from the description set forth hereinafter when considered in conjunction with the accompanying drawings, in which.

Figure 1:
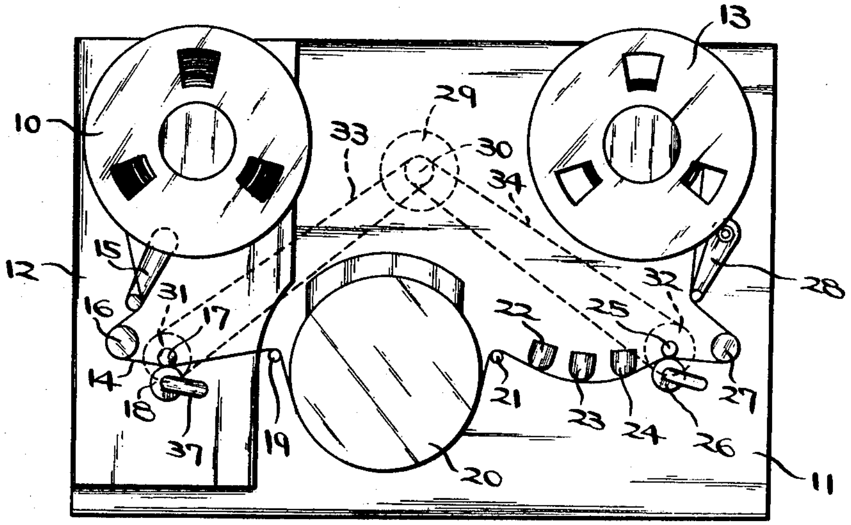
FIGS. 1 and 2 are a plan view and a front view respectively of one embodiment of magnetic recording and reproducing apparatus in which the system according to this invention can be incorporated.
Figure 2:
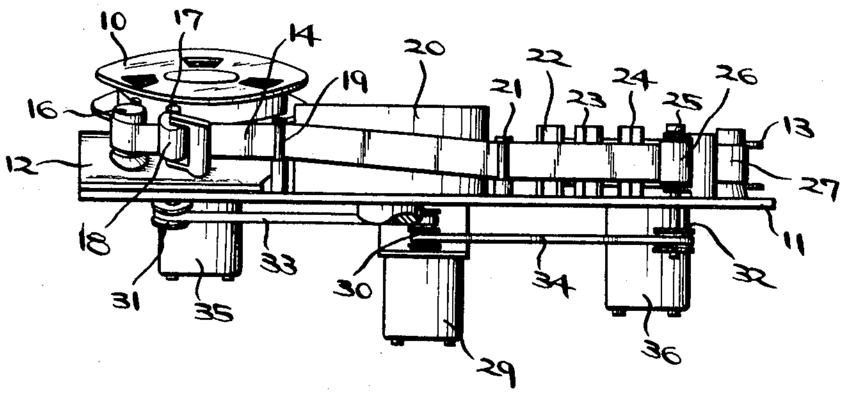

In FIGS. 1 and 2, a supply reel 10 is rotatably mounted on a slant deck 12 inclined forwardly with respect to a horizontal deck 11. A takeup reel 13 is rotatably mounted on said horizontal deck 11. A magnetic tape 14 paid out from said supply reel 10 is brought into contact with a tension arm 15 and a guide pole 16, moved between a capstan 17 and a pinch roller 18, moved past a guide pole 19, moved around a guide drum 20 for a distance corresponding to about one-half the circumference thereof, moved past a guide pole 21, brought into contact with a magnetic sound-erasing head 22, a magnetic sound-recording head 23 and a magnetic sound-reproducing head 24, moved between a capstan 25 and a pinch roller 26, moved past a guide pole 27 and a tension arm 28, and wound on the takeup reel 13. The guide drum 20 comprises upper and lower guide drum portions spaced apart from each other by a gap. Rotatably mounted between said upper and lower guide drum portions is a rotary body which supports two magnetic video signal recording and reproducing heads disposed on the peripheral edges of the rotary body in positions which are diametrically opposed to each other so that the head tips of the magnetic heads stick out of said gap. The tape 14 is moved obliquely with respect to the gap in the guide drum.

Fixed on the underside of the horizontal deck 11 is a capstan motor 29 which has a rotary shaft on which a pulley assembly 30 is mounted. A belt 33 is mounted between one member of said pulley assembly 30 and a capstan pulley 31 mounted on the lower portion of a rotary shaft of the capstan 17, and a belt 34 is mounted between the other of said pulley assembly 30 and a capstan pulley 32 mounted on the lower portion of a rotary shaft of the capstan 25. Rotational forces of the capstan motor 29 are transmitted through said belts 33 and 34 to the capstans 17 and 25 so as to rotate the same in the same direction. A supply reel motor 35 and a takeup reel motor 36 are mounted on the undersides of the slant deck 12 and horizontal deck 11 respectively.

Figure 3:
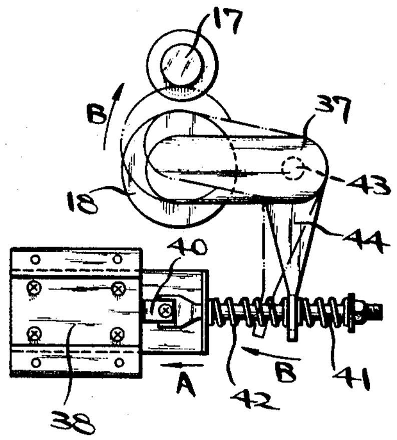
FIGS. 3 to 5 are a plan view, a front view with certain parts being cut out, and a side view with certain parts being cut out respectively of a pinch roller assembly of the apparatus.
Figure 4:
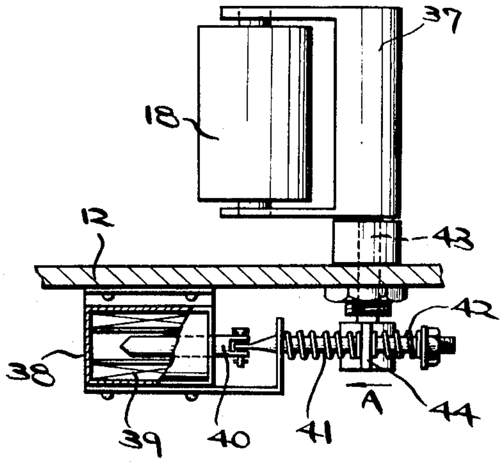
Figure 5:
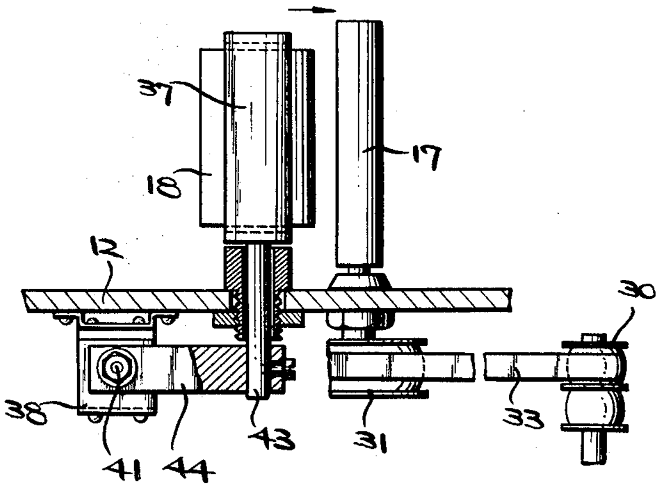

The pinch roller 18 is rotatably mounted on a pinch roller arm 37 as shown in FIGS. 3 to 5. Upon energization of a solenoid 39 of a plunger 38, a sliding rod 40 is withdrawn into said solenoid 39 and a sliding shaft 41 coupled to said sliding rod 40 moves in sliding motion in the direction of arrow A against the biasing force of a spring 42. As the sliding shaft 41 moves in sliding motion, a lever 44 fixed at one end to said sliding shaft 41 and at the other end to a rotary shaft 43 of the pinch roller arm 37 is moved in pivotal motion in the direction of arrow B. This causes the pinch roller 18 to move to a position shown in double dot-and-dash lines where it is pressed against the capstan 17. The aforementioned mechanism described with reference to the pinch roller 18 is similar to the mechanism involving the pinch roller 26, so that the explanation of the latter is omitted.

In the conventional magnetic recording and reproducing apparatus of the double capstan type, the peripheral speed of the capstan 25 is set at a level slightly higher than that of the peripheral speed of the capstan 17 so as to tension a portion of the magnetic tape 14 which is maintained in contact with the guide drum. The end is attained by moving the belts 33 and 34 at different rates or slightly varying the diameter of the pulley 31 from that of the pulley 32. With this arrangement, the tension of a portion of the magnetic tape disposed between the two capstans 25 and 17 is increased when the pinch rollers 18 and 26 are simultaneously caused to press against the capstans 17 and 25 in initiating the movement of the tape 14, because the peripheral speed of the capstan 25 is slightly higher than the peripheral speed of the capstan 17. The increased tension of the tape applies a greater load to the capstan 25 and causes a slip to occur between the belt 34 and capstan pulley 32, with the result that the peripheral speed of the capstan 25 is reduced. The increased tension of the portion of the tape disposed between the capstans 25 and 17 causes, on the other hand, a slip to occur between the belt 33 and capstan pulley 31 because the tape 14 is pulled with a great force. This results in an increase in the peripheral speed of the capstan 17. Thus, an increase in the tension of the portion of the tape disposed between the two capstans 25 and 17 results in a reduction in the peripheral speed of the capstan 25 and an increase in the peripheral speed of the capstan 17. This causes loosening of the tape, so that the tension of the tape becomes constant while moving. If the portion of the magnetic tape disposed between the capstans 25 and 17 is weakly tensioned, the mechanism operates such that the tension of the tape is increased as contrasted to the case just described, whereby the tension of the magnetic tape can be maintained at a constant value at all times.

In the system according to this invention, the pinch rollers 26 and 18 are not simultaneously brought into pressing contact with the capstans 25 and 17 respectively but the pinch roller 26 is first brought into pressing contact with the capstan 25 to cause the magnetic tape 14 to move, when the movement of the magnetic tape is to be initiated. Then, after the portion of the magnetic tape maintained in contact with the peripheral surface of the guide drum 20 has become properly tensioned while moving, the pinch roller 18 is caused to press against the capstan 17 so as to drive the magnetic tape by the two capstans 25 and 17.

Figure 6:
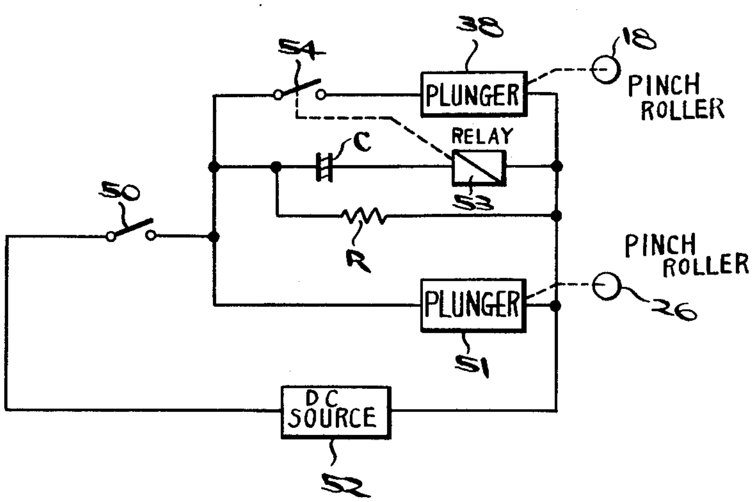
FIG. 6 is a systematic circuit diagram of one embodiment of the electrical circuit system for carrying out the system according to this invention into practice.

One embodiment of means for causing the pinch roller 18 to operate with a time lag with respect to the pinch roller 26 will now be explained with reference to FIG. 6. If a starting switch 50 is closed to initiate the movement of the magnetic tape 14, a circuit connecting a plunger 51 for actuating the pinch roller 26 on the takeup real side with a DC power source 52 of DC 24 volts is formed, so that the plunger 51 is energized and actuated. Actuation of the plunger 51 brings the pinch roller 26 into pressing engagement with the capstan 25 to hold the magnetic tape 14 between them and cause the same to start moving. A relay 53 is actuated during the time a capacitor C is charged, but a switch 54 adapted to be operated by said relay 53 remains open during this period, so that the plunger 38 is not energized and remains inoperative. Thus, the pinch roller 18 remains out of contact with the capstan 17.

Upon completion of charging of the capacitor C, the relay 53 is rendered inoperative and the switch 54 is closed so as to actuate the plunger 38. Operation of the plunger 38 brings the pinch roller 18 into pressing engagement with the capstan 17 to hold the magnetic tape 14 between them. Thus, the magnetic tape 14 is driven by the tape drive means consisting of the capstan 17 and pinch roller 18 as well as by the tape drive means consisting of the capstan 25 and pinch roller 26. The value of the capacitor C is selected at 1,000 $\mu$f. and the value of a resistor R connected in parallel with a series circuit consisting of the capacitor C and relay 53 is selected at 560$\Omega$. The charging time of the capacitor C is 0.5 second, so that the pinch roller 18 is brought into pressing engagement with the capstan 17 0.5 second after the pinch roller 26 is brought into pressing engagement with the capstan 25. If the switch 50 is opened, the charge of the capacitor C is discharged through the resistor R and the winding of the relay 53.

From the foregoing description, it will be appreciated that in the embodiment just described first tape drive means consisting of the capstan 25 and pinch roller 26 is first actuated so as to initiate the movement of the magnetic tape and then second tape drive means consisting of the capstan 17 and pinch roller 18 is actuated with a time lag of 0.5 second, so that the tension of the portion of the magnetic tape disposed between said first and second tape drive means reaches a constant level when the second tape drive means is actuated.

Figure 7:
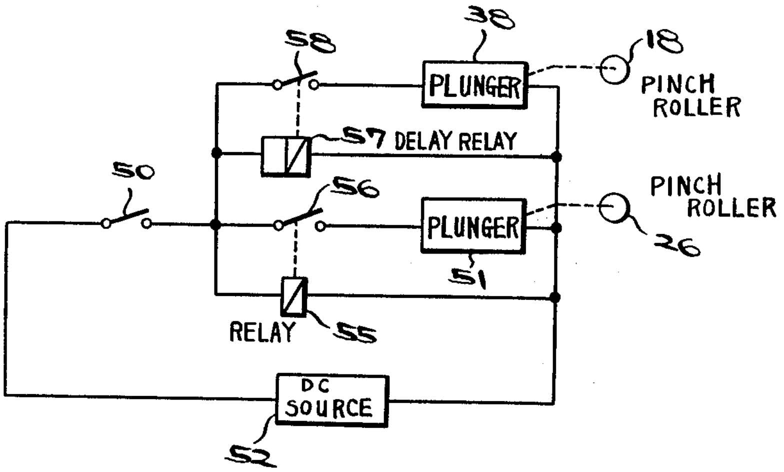
FIG. 7 is a systematic circuit diagram of another embodiment.

FIG. 7 is a systematic circuit diagram of another embodiment. Upon closure of a starting switch 50, a circuit connecting a relay 55 with a DC power source 52 is formed so as to actuate the relay 55. Operation of the relay 55 closes a switch 56 to thereby actuate a plunger 51. This brings the pinch roller 26 into pressing engagement with the capstan 25, so that the movement of the magnetic tape is initiated. A delay relay 57 is actuated with a time lag of 0.5 second following the closure of the switch 50 to close a switch 58. This actuates the plunger 38, so that the pinch roller 18 is brought into pressing engagement with the capstan 17.

In the two embodiments described above, the pinch roller 26 on the tape takeup side is actuated earlier than the pinch roller 18 on the tape supply side because this permits to increase the tension of the portion of the magnetic tape which is brought into contact with the magnetic heads so as to bring the tape into optimal contact with the heads, thereby permitting the heads to immediately record or reproduce a signal. However, it should be understood that the present invention is not limited to this manner of operation of the pinch rollers, and that the pinch roller 18 may be caused to come into pressing contact with the capstan 17 earlier than the pinch roller 26 comes into pressing contact with the capstan 25 so long as the tension of the portion of the magnetic tape 14 disposed between the two tape drive means, particularly the portion of the magnetic tape 14 which is in contact with the peripheral surface of the guide drum 20, can be kept constant while the tape travels. Alternatively, the reel motors 36 and 35 may be actuated before the pinch rollers 26 and 18 are brought into pressing engagement with the capstans 25 and 17 respectively so as to first tension the magnetic tape 14 as desired and then actuate the pinch rollers 26 and 18 with a time lag.

What we claim is:

1. A magnetic tape movement-initiation system comprising a magnetic tape paid out from a supply reel and wound on a takeup reel, two magnetic tape drive means disposed in the path of travel of said magnetic tape and spaced apart from each other, and actuation delay means causing one of said two magnetic tape drive means to operate with a time lag with respect to the other of said two magnetic tape drive means when the movement of said magnetic tape is to be initiated.

2. A magnetic tape movement initiation system as defined in claim 1 in which the portion of the magnetic tape disposed in a portion of the path of travel of the magnetic tape which is disposed between said two magnetic tape drive means is brought into contact with a magnetic recording and reproducing section comprising magnetic heads.

3. A magnetic tape movement initiation system as defined in claim 1 in which said actuation delay means actuates the magnetic drive means of said two magnetic tape drive means which is disposed near to the supply reel later than the magnetic tape drive means of said two magnetic tape drive means which is disposed near the takeup reel.

4. A magnetic tape movement-initiation system as defined in claim 1 in which said actuation delay means comprises means for breaking and forming a power source circuit, first plunger means which is immediately actuated upon closure of said means for breaking and forming a power source circuit to cause one of said two magnetic tape drive means to operate, second plunger means for actuating the other of said two magnetic tape drive means, and means for actuating said second plunger means with a time lag following the closure of said means for breaking and forming a power source circuit.

5. A magnetic tape movement-initiation system as defined in claim 4 in which said means for actuating said second plunger means with a time lag comprises a capacitor commencing to charge upon closure of said means for breaking and forming a power source circuit, and relay means rendering said second plunger means inoperative during the charging period of said capacitor and rendering the same operative after said charging period has elapsed.

6. A magnetic tape movement-initiation system as defined in claim 4 in which means for actuating said second plunger means with a time lag includes a delay relay which is closed after a predetermined time has elapsed following the closure of said means for breaking and forming a power source circuit so as to actuate said second plunger means.

7. A magnetic tape movement-initiation system as defined in claim 1 in which said two magnetic tape drive means each comprise a capstan and a pinch roller adapted to come into pressing engagement with said capstan, and said actuation delay means includes means for causing said pinch rollers to press against the respective capstans.

8. A magnetic tape movement-initiation system as defined in claim 1 in which the time lag with which one said two magnetic drive means is caused to operate with respect to the other of said two magnetic tape drive means by said actuation delay means is substantially in the order of 0.5 second.

9. A magnetic tape movement-initiation system as defined in claim 7 in which each of said capstans is rotated by each of rotational forces separately transmitted from a common drive motor.

10. A magnetic tape movement-initiation system as defined in claim 7 in which the magnetic tape drive means of said two magnetic tape drive means which is disposed near to said takeup reel is actuated slightly earlier than the magnetic tape drive of said two magnetic tape drive means which is disposed near to said supply reel so as to thereby initiate the movement of said magnetic tape.